US006804049B2

(12) United States Patent
Ogino et al.

(10) Patent No.: US 6,804,049 B2
(45) Date of Patent: Oct. 12, 2004

(54) MICROSCOPE DEVICE AND MICROSCOPE SYSTEM

(75) Inventors: Katsumi Ogino, Kamakura (JP); Yasushi Ogihara, Yokohama (JP); Chikaya Iko, Yokohama (JP)

(73) Assignee: Nikon Corporation, Tokyo (JP)

(*) Notice: Subject to any disclaimer, the term of this patent is extended or adjusted under 35 U.S.C. 154(b) by 267 days.

(21) Appl. No.: 09/985,602

(22) Filed: Nov. 5, 2001

(65) Prior Publication Data

US 2002/0060842 A1 May 23, 2002

(30) Foreign Application Priority Data

Nov. 6, 2000 (JP) ....................................... 2000-337934

(51) Int. Cl.[7] ................................................ G02B 21/00
(52) U.S. Cl. ........................ 359/368; 359/363; 359/380
(58) Field of Search .......................... 359/363, 368–390

(56) References Cited

U.S. PATENT DOCUMENTS 4,168,881 A 9/1979 Rosenberger ............... 359/381
5,038,035 A * 8/1991 Nishimura et al. ......... 250/311
5,276,550 A * 1/1994 Kojima ....................... 359/368
5,450,233 A * 9/1995 Yamamoto et al. ......... 359/368
5,751,420 A * 5/1998 Iida et al. ................... 356/328
5,949,574 A 9/1999 Kapitza ...................... 359/369
6,157,484 A * 12/2000 Nishida ...................... 359/434
6,259,093 B1 * 7/2001 Wakiyama et al. ......... 250/306
6,456,430 B1 * 9/2002 Kasahara et al. ........... 359/380

FOREIGN PATENT DOCUMENTS

DE 196 09 288 A1 9/1996
DE 198 12 599 A1 9/1999
JP A 10-333056 12/1998
JP A 10-339845 12/1998
JP B2 3081699 6/2000

OTHER PUBLICATIONS

English Abstract of Japanese reference No. 10–333056.
English Abstract of Japanese reference No. 10–339805.
English Abstract of Japanese reference No. 5–232385.

* cited by examiner

*Primary Examiner*—Thong Q Nguyen
(74) *Attorney, Agent, or Firm*—Oliff & Berridge, PLC

(57) ABSTRACT

A microscope device includes a support member which supports a specimen, a first optical system which generates an image of a partial region upon the specimen, a second optical system which generates an overall image of the specimen, an imaging device which photoelectrically detects the images which are generated by the first optical system and by the second optical system, and a changeover mechanism which changes over between a first path from the specimen via the first optical system to the imaging device and a second optical path from the specimen via the second optical system to the imaging device. The support member, the first optical system, the second optical system, the imaging device, and the changeover mechanism are all housed within a case of the microscope device.

18 Claims, 12 Drawing Sheets

30 (MICROSCOPE DEVICE)
Z DIRECTION
X DIRECTION 1, 4 (MICROSCOPE SYSTEM)

3 (MICROSCOPE SYSTEM)

40
Z DIRECTION
18
10c
17a
17c
10A
14a
14b
X DIRECTION
FIXED
11
78
16
41

43
FIXED
42
FIXED
41

MICROSCOPE DEVICE AND MICROSCOPE SYSTEM

The disclosure of the following priority application is herein incorporated by reference:

Japanese Patent Application No. 2000-337934, filed Nov. 6, 2000.

BACKGROUND OF THE INVENTION

1. Field of the Invention

The present invention relates to a microscope device and a microscope system which include an optical system which is housed within a case of the microscope device.

2. Related Art

There is a known type of box shaped microscope device in which an optical system is housed within a case, such as disclosed in Japanese Laid-Open Patent Publication No. H8-271794. With this box shaped microscope device, the optical systems is entirely housed within a case. By doing this it is possible to enhance the freedom for selecting the location in which the microscope device is to be set up. For example, if this box shaped microscope device is positioned on the floor, it is possible for the user to use the surface of his table or desk freely.

However, if a box shaped microscope device is positioned upon the floor, the observer is forced into an unnatural attitude in order to be able to look through the eyepiece lens directly. Thus, a display monitor is provided upon the desk or table, and the image which is generated by a box shaped microscope device is displayed upon this monitor. An optical image of a minute region upon the specimen which is generated by the box shaped microscope device, i.e. a so called microscope image, is converted into electronic form by an image-capturing element which is provided within the case of the microscope device, and this electronic image is outputted to the monitor.

Furthermore, the mechanisms which shift the sample stage and which change the observational magnification have also been converted to electrical operation. By doing this, the observer is not required to assume any unnatural attitude, and, simply by actuating a keyboard and/or mouse which are provided upon the desk, can shift the sample stage and change the operational magnification.

In order to observe a desired point upon the specimen, first the observational magnification is set to a low magnification value and a wide region upon the specimen is observed, and the sample stage is shifted by minute amounts so that the desired point comes into the field of view of the optical system. And the observational magnification is progressively shifted towards a high magnification value. In order to shift the desired point to the central point in the field of view, it is necessary to check which region upon the specimen the currently observed microscope image falls.

Normally, with a microscope which is not of the box shaped type, the observer removes his eye from the eyepiece lens, observes the positional relationship between the sample stage and the objective lens, and checks the region of the microscope image upon the specimen.

However, in the case of a box shaped microscope, a supplementary function is provided of automatically obtaining image data for an overall image of the entire specimen. Upon the display monitor, not only is the microscope image displayed, but also this overall image of the entire specimen is displayed as well. By doing this, it is possible for the observer to check the region upon the specimen in which the microscope image falls, without inspecting the specimen directly by eye. It should be understood that, in the related art, a specimen which is inserted from the outside is scanned by a line shaped diode array which is provided in a sample insertion and removal aperture of the case, in order to capture image data for this entire overall image of the specimen.

As described above, a box shaped microscope device is operated electrically, and is implemented in conjunction with an information processing device such as a computer. However, the following problems are experienced with a box shaped microscope device. First, a considerable time period is required in order to display an overall image. Second, depending upon the location of use, there is a possibility that the optical system may vibrate due to the passage of personnel or the like, so that the overall image of the specimen to be displayed upon the display monitor may become confused.

SUMMARY OF THE INVENTION

The objective of the present invention is to provide a box shaped microscope device, and a microscope system, for which the actuation characteristics and the observational environment provided are excellent.

In order to achieve the above described objective, the microscope device according to the present invention includes: a support member which supports a specimen; a first optical system which generates an image of a partial region upon the specimen; a second optical system which generates an overall image of the specimen; a imaging device which photoelectrically detects the images which are generated by the first optical system and by the second optical system; and a changeover mechanism which changes over between a first optical path from the specimen via the first optical system to the imaging device and a second optical path from the specimen via the second optical system to the imaging device. And the support member, the first optical system, the second optical system, the imaging device, and the changeover mechanism are housed within a case.

Furthermore, in order to achieve the above described objective, there is provided a microscope device including, housed internally to a case: a support member which supports a specimen; an optical system which generates an image of a partial region upon the specimen; and an imaging device which photoelectrically detects the image of the partial region which is generated by the optical system; wherein the case has a frame structure, and the support member, the optical system, and the imaging device are fixed to the frame structure via an anti vibration mechanism which reduces vibration.

DETAILED DESCRIPTION OF THE PREFERRED EMBODIMENTS

Embodiment 1

Figure 1:
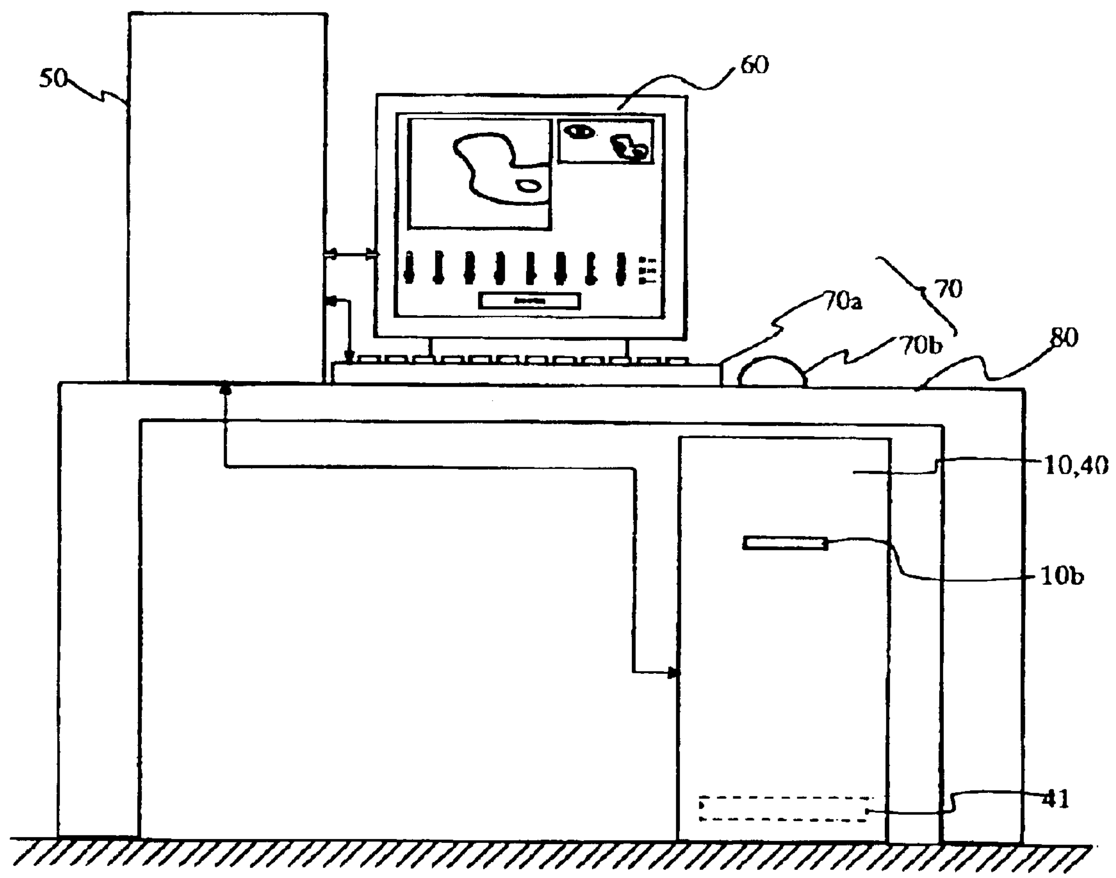
FIG. 1 is an overall structural view of a microscope system according to the first and the fourth preferred embodiments of the present invention.
Figure 2:
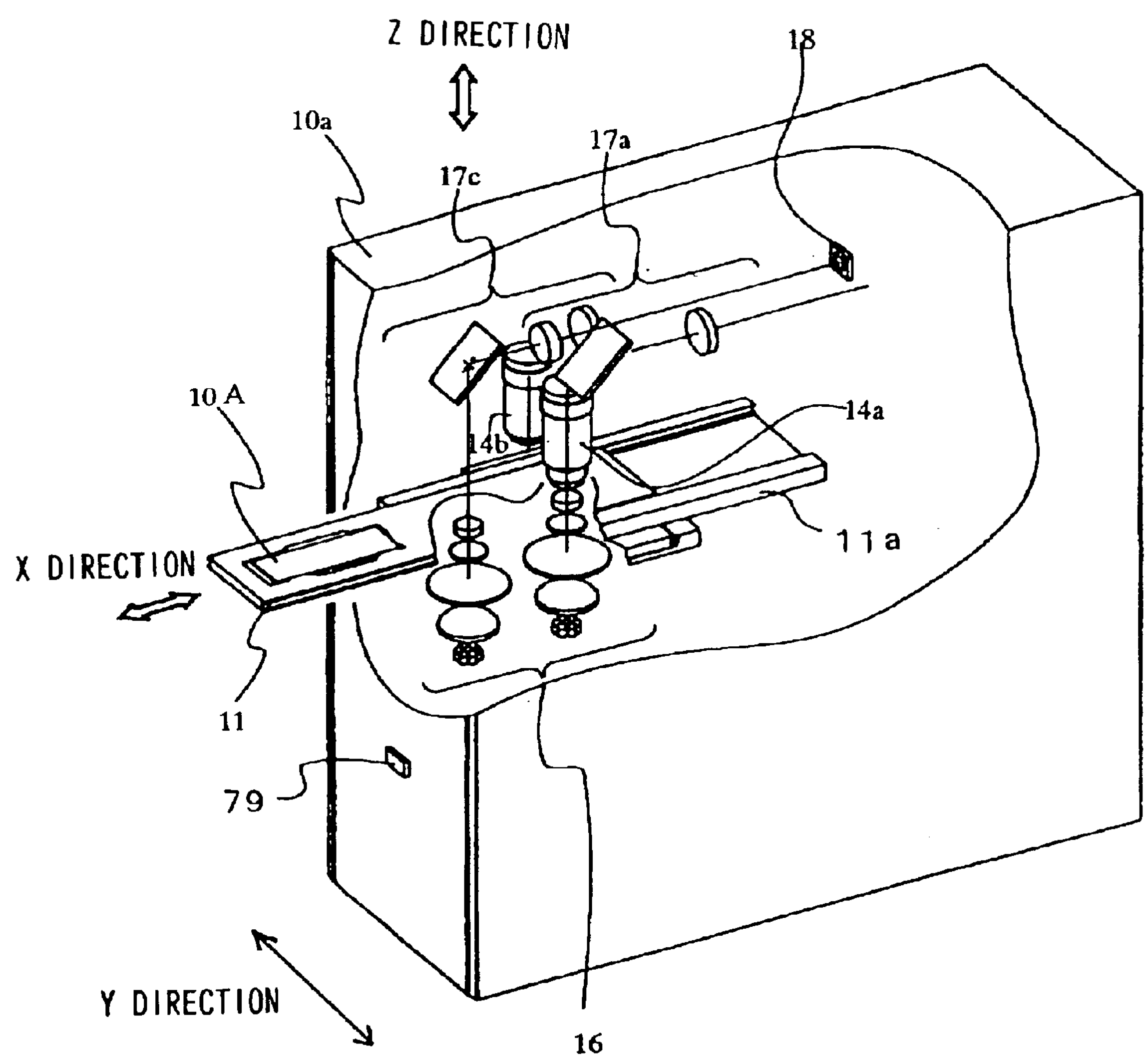
FIG. 2 is a partly cutaway perspective view of a microscope device according to the first preferred embodiment.

A first preferred embodiment of the microscope device according to the present invention will now be explained with reference to FIGS. 1 through 7 of the drawings. FIG. 1 is an overall structural view of a microscope system 1 which incorporates a microscope device 10, according to the first embodiment of the present invention. FIG. 2 is a partly cutaway perspective view of the microscope device 10 and FIG. 3 is a structural view of the microscope device 10.

As shown in FIG. 1, this microscope system 1 comprises the microscope device 10, a host computer 50, a display device 60, and an input device 70 which may consist of a keyboard 70*a* and/or a mouse 70*b* and the like. The host computer 50, the display device 60, and the input device 70 are disposed upon a work bench 80. The microscope device 10 is disposed under the work bench 80 upon the floor. Each of the microscope device 10, the display device 60, and the input device 70 is connected to the host computer 50.

The host computer 50 comprises a control board for the microscope device 10 which will be described hereinafter, a CPU, a memory, etc. A GUI (Graphical User Interface) is provided upon the host computer 50. The host computer 50 displays upon the display device 60, along with the microscope image, also images for soliciting various inputs from the operator. The operator actuates the input device 70 while viewing the display device 60, and inputs commands for the microscope device 10. Here, by the “microscope image” is meant an optical image of a minute region upon the specimen which is generated by the microscope device 10.

Figure 3:
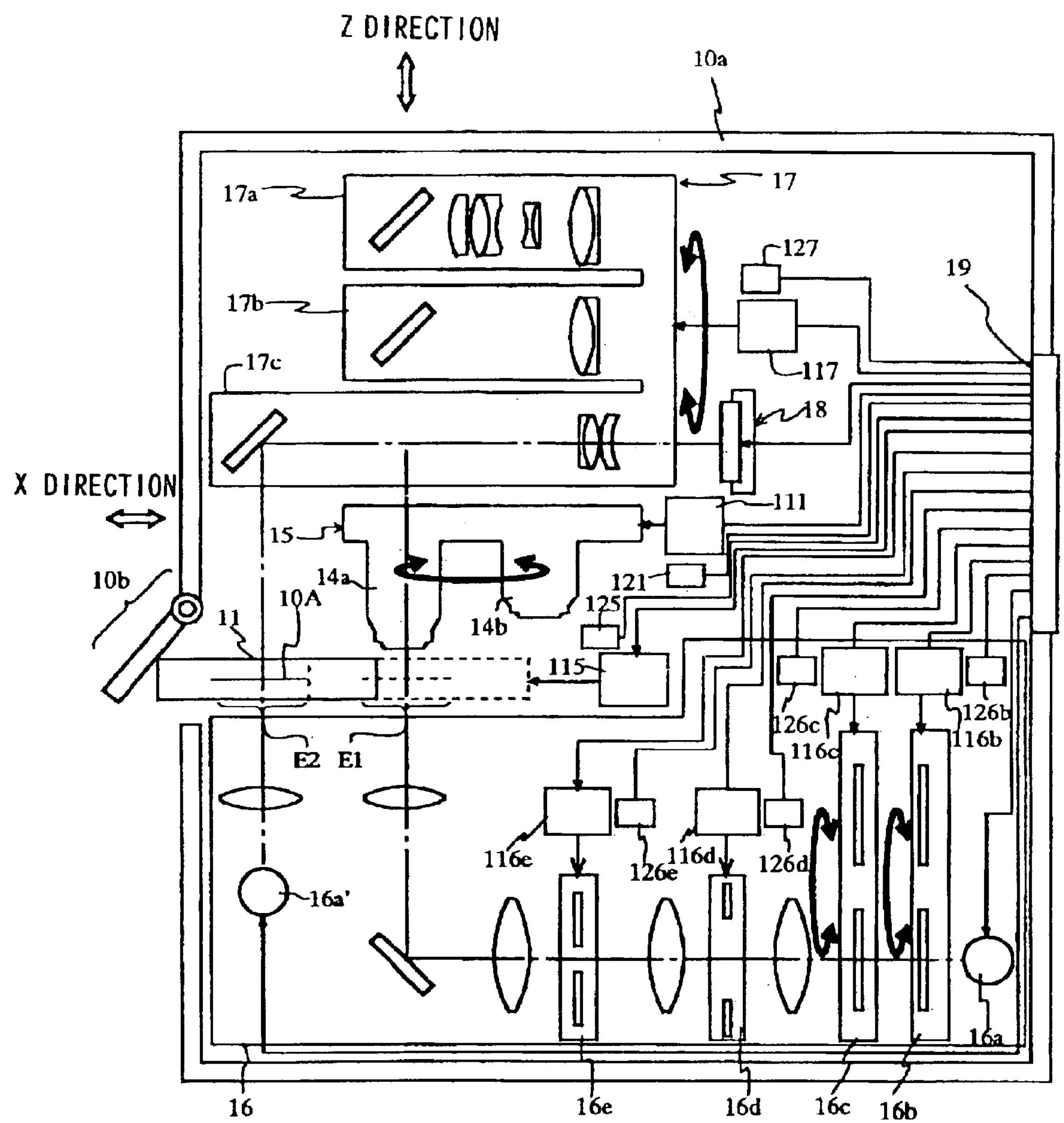
FIG. 3 is a structural view of this microscope device according to the first preferred embodiment.
Figure 4:
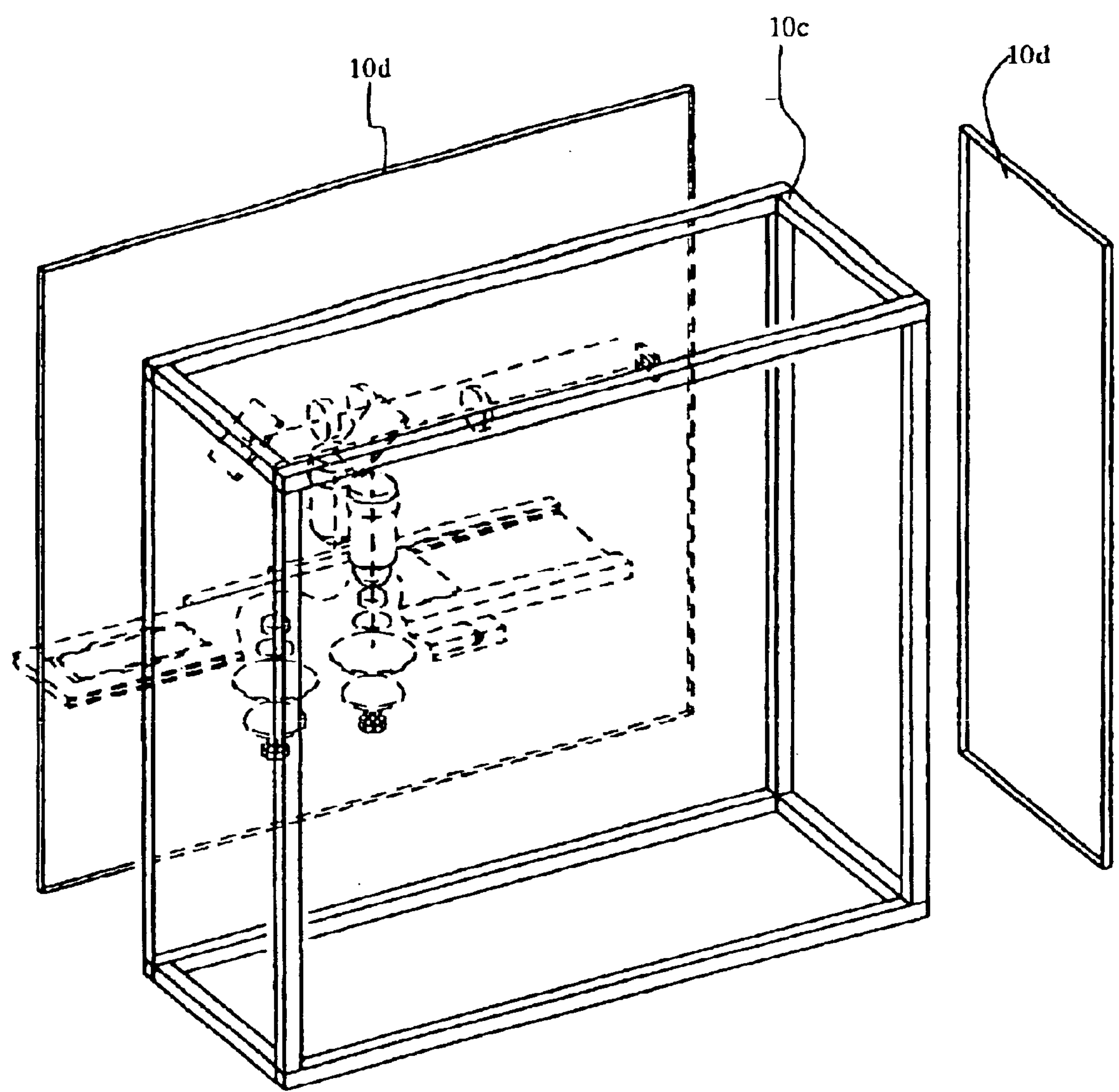
FIG. 4 is a perspective view showing the structure of a case of this microscope device.

As shown in FIGS. 2 and 3, the optical system of the microscope device 10 is entirely housed within a case (chassis) 10*a*. FIG. 4 is a figure showing the structure of this case 10*a*. As shown in FIG. 4, this case 10*a* comprises a frame 10*c* which is assembled as a rectangular parallelopiped, and a cover 10*d* which covers the outside of this frame 10*c*. It should be understood that, although in FIG. 4 only two side panel portions of the cover 10*d* are shown, in fact this cover 10*d* is formed to cover all sides of the frame 10*c* as well as its upper surface. Moreover, in one side surface of the cover 10*d* there is provided an insertion and removal aperture 10*b* which can open and close freely in order to allow a sample stage 11 which will be described hereinafter to be extended out from the interior of the case 10*a* to the outside, and to be retracted back from the outside into the case 10*a*.

The frame 10*c* desirably comprises at least a rectangular frame which defines the base of the case 10*a*, and four support posts which extend in the perpendicular direction from the four corners of said rectangular frame. In this manner, it is possible to reinforce the strength of the case 10*a* in the vertical direction, and it is possible to enhance the resistance of the structure to earthquakes.

A sample stage 11 which supports the sample to be tested (specimen) 10A is provided within the case 10*a*. As shown in FIGS. 2 and 3, this sample stage 11 is supported by stage guides 11*a* in a plane which is horizontal, and moreover is parallel to the X-Y plane which is defined by the X direction and the Y direction in FIG. 2. The sample stage 11 comprises the stage guides 11*a* and a gear mechanism not shown in the figures, which for example may be a rack and pinion gear mechanism or the like, and can be driven in the X direction as seen in FIGS. 2 and 3 along the stage guides 11*a* by this gear mechanism. It should be understood that a ball screw or a lead screw may be used, instead of the rack and pinion gear mechanism. By shifting the sample stage 11 in the X direction, the sample to be tested 10*A* is set to the microscopic image capture region E1 and to the overall image capture region E2. It should be understood that the stroke amount by which the sample stage 11 is shifted in the X direction is ensured to be sufficiently long for it to be able to provide the overall image capture region E2 between the microscopic image capture region E1 and the insertion and removal aperture 10*b*.

Furthermore, the sample stage 11 is made so as to be shiftable, not only in the X direction, but also in the Y direction and in the Z direction as shown in FIG. 2 as well. The Y direction and the Z direction are both perpendicular to the X direction, and are also perpendicular to one another. It should be understood that the Z direction is the direction of the optical axis of the objective lens facing the microscopic image capture region E1. The objective lens will be explained hereinafter.

Inside the case 10*a* of the microscope device 10 there are provided, a plurality of objective lenses which generate microscopic images of different magnifications, _and at least one _image forming optical system which forms an image of the specimen, an imaging section 18 which is arranged at predetermined position, captures the optical image which has been formed by the image forming optical system and generates image data therefrom, and a transmission illuminating section 16 which illuminates the sample stage 11 from its side opposite to the objective lens.

This plurality of objective lenses comprises a high magnification objective lens 14*a* and a low magnification objective lens 14*b*. It is possible to select the observational magnification according to the region for observation of the specimen. The objective lenses 14*a* and 14*b* are supported by an objective lens holder portion 15. This objective lens holder portion 15 applies either one of the high magnification objective lens 14*a* or the low magnification objective lens 14*b* to oppose the microscopic image capture region E1.

The objective lens holder portion 15 may, for example, be constituted by a turret (not shown in the figures) to which the objective lenses 14*a* and 14*b* are mounted, along with a gear mechanism (again not shown in the figures) which rotates the turret in steps via a click mechanism for bringing it to predetermined positions. Thus, this objective lens holder portion 15 can be changed over by operation of the gear mechanism so that either one of the objective lenses 14*a* and 14*b* is opposed to the microscopic image capture region E1.

The plurality of image forming optical systems comprise a high magnification magnified image observation optical system 17*a*, a low magnification magnified image observation optical system 17*b*, and an optical system 17*c* for capturing an overall image. These optical systems 17*a*, 17*b*, and 17$c$ are supported by an optical system support section 17. This optical system support section 17 inserts one or the other of the high magnification magnified image observation optical system 17$a$, the low magnification magnified image observation optical system 17$b$, and the optical system 17$c$ for capturing an overall image into the predetermined optical path from the sample to be tested 10A to the imaging section 18.

The optical system support section 17 may, for example, comprise a support member (not shown in the figures) which supports the high magnification magnified image observation optical system 17$a$, the low magnification magnified image observation optical system 17$b$, and the optical system 17$c$ for capturing an overall image so that they are lined up along the Y direction (the horizontal direction) as shown in FIG. 2, and a guide mechanism (also not shown in the figures) which slides this support member along the Y direction. It should be understood that in FIG. 3, for the convenience of explanation, the optical systems 17$a$, 17$b$, and 17$c$ are shown as being lined up along the Z direction. The optical system support section 17 is changed over so as, by driving the guide mechanism, to insert one or the other of the high magnification magnified image observation optical system 17$a$, the low magnification magnified image observation optical system 17$b$, and the optical system 17$c$ for capturing an overall image of the entire specimen into the predetermined optical path.

Thus, the high magnification magnified image observation optical system 17$a$ or the low magnification magnified image observation optical system 17$b$ are inserted into the optical path from either objective lenses 14$a$ and 14$b$, which is opposed to the microscopic image capture region E1, to the imaging section 18. Thus, the high magnification magnified image observation optical system 17$a$ or the low magnification magnified image observation optical system 17$b$ forms, at its own characteristic magnification, the light flux received after passing through the high magnification objective lens 14$a$ or the low magnification objective lens 14$b$, respectively.

On the other hand, the optical system 17$c$ for capturing an overall image is inserted into the optical path from the overall image capture region E2 which is provided between the microscopic image capture region E1 and the insertion and removal aperture 10$b$ to the imaging section 18. The optical system 17$c$ for capturing an overall image generates an optical image of the overall image capture region E2. Furthermore, the optical system 17$c$ for capturing an overall image is a fixed focus type image forming optical system. In other words, it is possible to generate upon the imaging surface of the imaging section 18 an optical image of the sample to be tested 10A without performing any focus adjustment, since the depth of focus is quite deep.

Figure 5:
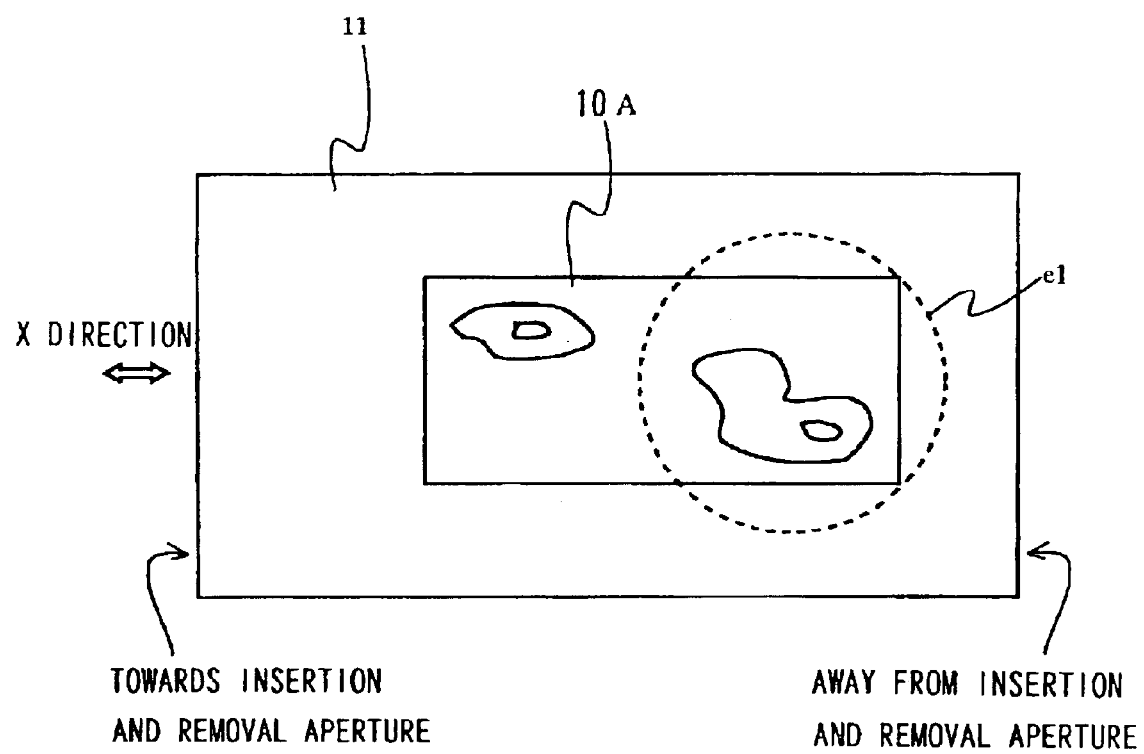
FIG. 5 is a view showing an example of a field of view region of an optical system for capturing an overall image.

FIG. 5 shows an example of the field of view region e1 of the optical system 17$c$ for capturing an overall image. As shown in FIG. 5, the field of view region e1 of the optical system 17$c$ for capturing an overall image corresponds to about half of the region of the entire sample to be tested 10A. This is markedly wider than the field of view region which is set by the combination of either of the high magnification objective lens 14$a$ or the low magnification objective lens 14$b$, together with the high magnification magnified observation image observation optical system 17$a$ or the low magnification magnified observation image observation optical system 17$b$ respectively.

Next, the transmission illumination section 16 shown in FIG. 3 will be explained.

This transmission illumination section 16 comprises a light source lamp 16$a$, a light reduction filter 16$b$, a special filter 16$c$, a field stop 16$d$, an aperture stop 16$e$, and the like. The transmission illumination section 16 conducts illumination light which is emitted from the light source lamp 16$a$ via the light reduction filter 16$b$, the special filter 16$c$, the field stop 16$d$, the aperture stop 16$e$, and a predetermined optical system to the microscopic image capture region E1.

It should be noted that the transmission illumination section 16 in this preferred embodiment of the present invention illuminates, not only the microscopic image capture region E1, but also the overall image capture region E2. It is possible to achieve this due to the provision of another light source lamp 16$a'$ which illuminates the overall image capture region E2, separately from the light source lamp 16$a$, as shown in FIG. 3. Or, alternatively, it would also be possible to arrange for the illumination light emitted from the light source lamp 16$a$ to fall, not only upon the microscopic image capture region E1, but also upon the overall image capture region E2.

The light reduction filter 16$b$ comprises a plurality of types of light reduction section for different amounts of light reduction, and is made so as to be able to vary the amount of light reduction which it applies to the illumination light from the light source lamp 16$a$. For example, the light reduction filter 16$b$ may comprise a rotatable holder and a plurality of types of light reduction section which are provided around the circumferential direction of this holder. In such a case, by rotating the holder, each of the light reduction sections can selectably be either inserted into or withdrawn from the optical path of the illumination light, so that the light reduction amount can be varied.

The special filter 16$c$ comprises a plurality of types of filter which have different optical characteristics, and is made so as to be able to vary the spectral distribution over wavelength of the illumination light from the light source lamp 16$a$. For example, in this case, the plurality of types of filter may include the following two types: a monochromatic interference filter, and a color conversion filter. Moreover, for example, the special filter 16$c$ may comprise a rotatable holder and a plurality of types of filter section which are provided around the circumferential direction of this holder. In such a case, by rotating the holder, each of the filter sections can selectably be either inserted into or withdrawn from the optical path of the ray bundle of the illumination light, so that the spectral distribution over wavelength can be varied.

The field stop 16$d$ increases or shrinks the field stop diameter for the illumination light from the light source lamp 16$a$. This field stop 16$d$ may, for example, comprise a plurality of vanes and a cam mechanism, just like an aperture of the type which is conventionally provided to a photographic camera or the like, and may vary the field stop diameter by operating the cam mechanism.

The aperture stop 16$e$ increases or shrinks the aperture stop diameter for the illumination light from the light source lamp 16$a$. This aperture stop 16$e$ may, for example, comprise a plurality of vanes and a cam mechanism, just like an aperture of the type which is conventionally provided to a photographic camera or the like, and may vary the aperture stop diameter by operating the cam mechanism.

In the above, the various sections which compose the microscope device 10 which is housed in the case 10$a$ have been explained. Each of these sections comprises an actuator and a sensor. The actuator which drives each section is controlled by the host computer 50. Furthermore, the drive states of the actuators are detected by the sensors, which transmit signals representative thereof to the host computer 50. In the following the sensor and actuator for each section will be explained with reference to FIG. 3.

To the sample stage 11 there are provided an actuator 115 which drives the gear mechanism of said sample stage 11, and a position detection sensor 125 which detects the position thereof. For example, a combination of a step motor and an origin detection sensor may be provided to the sample stage 11. To the objective lens holder portion 15 there are provided an actuator 111 which drives the gear mechanism of said objective lens holder portion 15, and a position detection sensor 121 which detects the position thereof. For example, a combination of a DC motor and a potentiometer may be provided to the objective lens holder portion 15. To the optical system support section 17 there are provided an actuator 117 which drives the mechanism (not shown in the figures) of said optical system support section 17, and a position detection sensor 127 which detects the position thereof. For example, a combination of a DC motor and a potentiometer may be provided to the optical system support section 17.

To the light reduction filter 16*b* there are provided an actuator 116*b* which rotates said light reduction filter 16*b*, and a position detection sensor 126*b* which detects the rotational position thereof. To the special filter 16*c* there are provided an actuator 116*c* which rotates said special filter 16*c*, and a position detection sensor 126*c* which detects the rotational position thereof. To the field stop 16*d* there are provided an actuator 116*d* which actuates the cam mechanism of said field stop 16*d*, and a position detection sensor 126*d* which detects the rotational position thereof. And to the aperture stop 16*e* there are provided an actuator 116*e* which actuates the cam mechanism of said aperture stop 16*e*, and a position detection sensor 126*e* which detects the rotational position thereof. Each of these actuators and position detection sensors may, for example, comprise a combination of a DC motor and a potentiometer.

The above described actuators 115, 111, 117, and 116*b* through 116*e*, the position detection sensors 125, 121, 127, and 126*b* through 126*e*, the light source lamps 16*a* and 16*a*', and the imaging section 18 are all electrically connected to the controller of the host computer 50 via a connector 19.

The host computer 50 controls the driving of the actuators 115, 111, 117, and 116*b* through 116*e*, based upon the signals from the position detection sensors 125, 121, 127, and 126*b* through 126*e* and upon commands which are inputted from the input device 70. In the following, the operation of a control program for the microscope device 10 which is executed by the CPU of the host computer 50 will be explained with reference to FIG. 6, which is a flow chart thereof. It should be understood that this control program is set in advance, and is stored in a memory device, not shown in the figures, of the host computer 50.

This control program is started by the power supply to the host computer 50 being turned on. When the power supply is thus turned on, in a first step S1 a control screen 78 such as the one shown in FIG. 7 is displayed upon the display device 60.

Figure 7:
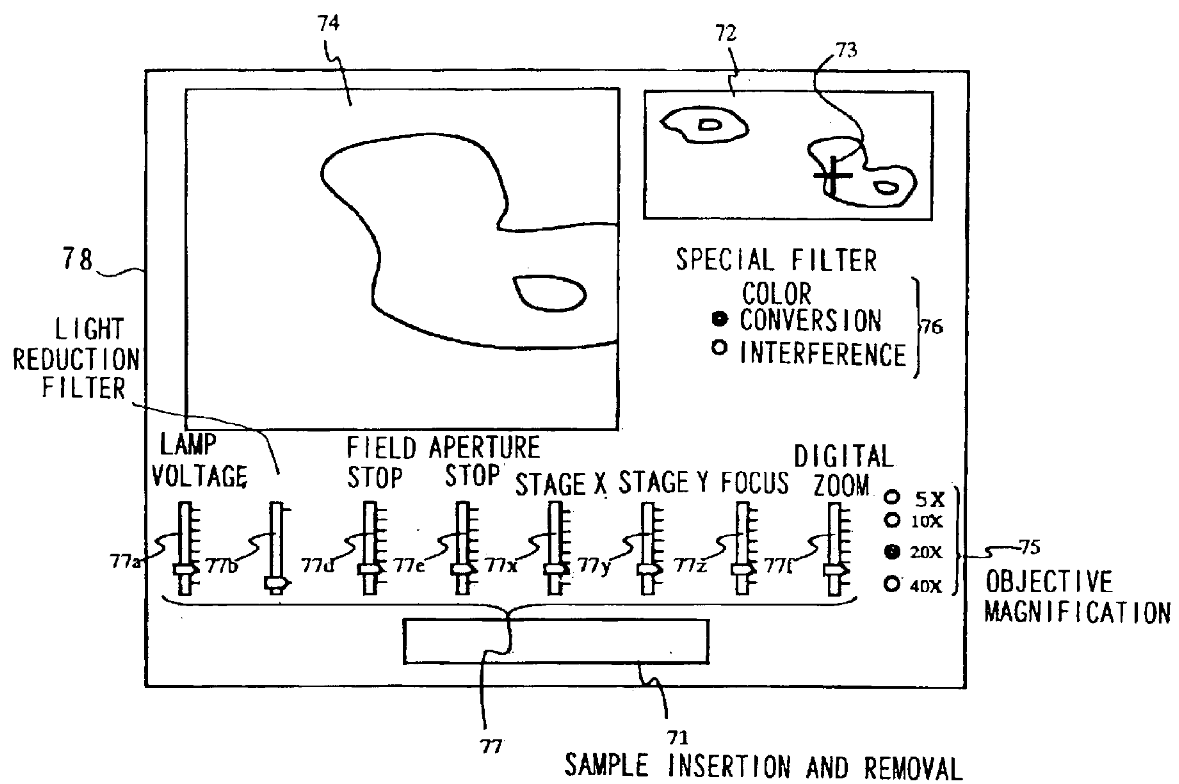
FIG. 7 is a view showing a control screen.

As shown in FIG. 7, upon the control screen 78 there are displayed control buttons 71, 75, 76, and 77, as well as an overall image 72 and a magnified image 74. The operator can change the settings of various sections of the microscope device 10 by actuating the control buttons 71, 75, 76, and 77. As control buttons, for example, there are a sample insertion and removal button 71 for ordering the sample stage 11 to be extended or retracted, a radio button 75 for setting the observational magnification, a radio button 76 for selecting the type of special filter 16*c* to be employed, and sliders 77. Furthermore, a cross cursor 73 is also provided for designating the point of observation. These control buttons will be explained in detail hereinafter. It should be understood that the overall image 72 and the magnified image 74 shown upon the control screen 78 shown in FIG. 7 are shown in the state in which a sample to be tested 10A has already been set up upon the sample stage 11.

The host computer 50 displays the control screen 78 based upon the values of the various settings of the microscope device 10. In other words, the values of the various settings of the microscope device 10, i.e. the actuation states of the control buttons 71, 75, 76, and 77, are reflected in the contents displayed upon the display screen 78.

In the first preferred embodiment of the present invention, the operator selects the sample insertion and removal button 71 upon the control screen 78 by using the input device 70 so as to open the insertion and removal aperture 10*b* of the microscope device 10. Furthermore, this insertion and removal aperture 10*b* can be closed by selecting this sample insertion and removal button 71 again.

Next, in a step S2, a decision is made as to whether or not the sample insertion and removal button 71 is being selected. If in this step S2 it is determined that indeed the sample insertion and removal button 71 is being selected, then the flow of control proceeds to the next step S3. In this step S3, a command signal is outputted to the actuator 115 of the sample stage 11, so that the sample stage 11 shifts in the X direction and projects to the outside through the insertion and removal aperture 10*b*. In this state with the sample stage 11 projecting to the outside through the insertion and removal aperture 10*b* as shown in FIG. 2, the operator sets the sample to be tested 10A upon the sample stage 11.

Next, in a step S4, a decision is made as to whether or not the sample insertion and removal button 71 is being selected again. If in this step S4 it is determined that indeed the sample insertion and removal button 71 is being selected in the current state in which the sample stage 11 is projected to the outside through the insertion and removal aperture 10*b*, then the flow of control proceeds to the next step S5.

In this step S5, a command signal is outputted to the actuator 115 of the sample stage 11. Furthermore, a command signal is outputted to the actuator 117 of the optical system support section 17. According to the command signal, the actuator 115 shifts the sample stage 11 in the X direction so as to retract it back into the interior of the microscope device 10. The sample stage 11 stops when it reaches a point at which the sample to be tested 10A is in the overall image capture region E2. The actuator 117 changes over the optical system support section 17 so as to set the optical system 17*c* for capturing an overall image into the optical path. It should be understood that the above described FIG. 5 shows the positional relationship between the field of view region e1 of the optical system 17*c* for capturing an overall image and the sample to be tested 10A, in the state in which, along with the sample to be tested 10A having been set (in the step S5) into the overall image capture region E2, also the optical system 17*c* for capturing an overall image has been set into the optical path.

In the next step S6, the image data for an overall image of the sample to be tested 10A captured by the imaging section 18 is generated, and is displayed upon the control screen 78. It is possible for the operator to display the overall image 72 upon the control screen 78 of the display device 60 simply by setting the sample to be tested 10A upon the sample stage 11 and selecting the sample insertion and removal button 71. It should be understood that the overall image capture region E2 is illuminated by the illumination lamp 16*a*' sufficiently brightly for this overall image to be obtained. This generation of the image data for the overall image will be described hereinafter.

This overall image 72 continues to be displayed upon the control screen 78 until the operator issues a command for terminating this display.

Next, in a step S7, a command signal is outputted to the actuator 115 to shift the sample stage 11 in the X direction once again. This movement of the sample stage 11 is stopped when the sample to be tested 10A arrives at the microscopic image capture region E1. Furthermore, according to the state of actuation of the radio button 75, command signals are outputted to the actuators 115 and 117 so as to change over the objective lens holder portion 15 and the optical system support section 17 respectively. The objective lens holder portion 15 sets the high magnification objective lens 14*a* or the low magnification objective lens 14*b* to confront the sample to be tested 10A which is in the microscopic image capture region E1. The optical system support section 17 sets the high magnification magnified image observation optical system 17*a* or the low magnification magnified image observation optical system 17*b* into the optical path.

After the observational magnification has been set in the step S7, the flow of control proceeds to the step S8. In this step S8, a decision is made as to whether or not any command is being issued by the operator by actuation of any of the control buttons 73, 75, 76, or 77 upon the control screen 78 for changing the value of any of the settings of the microscope device 10. In the next step S9, command signals are outputted to the various actuators 111, 115, 117, and 116*b* through 116*e*, as appropriate, for altering the values of the settings of the microscope device 10 according to the actuation states of the control buttons 73, 75, 76, and 77. The various actuators 111, 115, 117, and 116*b* through 116*e* alter the settings of the various sections of the microscope device 10 according to these command signals.

According to this first preferred embodiment of the present invention, a cross cursor 73 is provided upon the overall image 72 in superimposing manner, as shown in FIG. 7. This cross cursor 73 indicates the position upon the overall image 72 which corresponds to the magnified image 74. The operator can easily distinguish the current point of observation upon the sample to be tested 10A by the position of the cross cursor 73 upon the overall image 72. In the following, when the cross cursor 73 is actuated, changing of the values of settings of the microscope device 10 by this actuation will be explained in terms of the procedures of the steps S8 and S9.

The operator actuates the cross cursor 73 upon the control screen 78 by using the input device 70, and designates the desired observation point upon the overall image 72. When the observation point has thus been designated by the cross cursor 73, the host computer 50 outputs a command signal to the actuator 115 for the sample stage 11, and shifts the sample stage 11 in the X direction and in the Y direction in order to bring the optical axis of the currently set objective lens 14*a* or 14*b* (as the case may be) to the observation point. When the optical axis of the objective lens has been brought to the observation point, the sample stage 11 is shifted in the Z direction so as to perform focus adjustment.

This focus adjustment can easily be implemented by a hill climbing method or the like, based upon the strength of the image signal which is captured by the imaging section 18. This focus adjustment method is a per se known method which is employed in a video camera or the like, and its description will be omitted in the interests of brevity. It should be understood that, for this focus adjustment, it would be acceptable to shift the optical system on the objective lens side, rather than shifting the sample stage 11. After performing focus adjustment, the imaging section 18 is driven, and a magnified image of the observation point upon the sample to be tested 10A, in other words image data of the microscopic image, is captured. This captured microscope image is displayed upon the control screen 78 as a magnified image 74. The process of focus adjustment will be explained hereinafter.

Here, the manner in which the observation point can easily be designated by actuating the cross cursor 73 has been explained. Change of the values of settings of the microscope device 10 by the actuation of the other control buttons 75, 76, and 77, will also be explained hereinafter.

As explained above, in the steps S8 and S9 the values of the settings of the microscope device 10 are altered, and the magnified image 72 of the sample to be tested 10A around the desired point of observation is displayed upon the control screen 78. After this, the flow of control proceeds to a step S10. In this step S10, a decision is made as to whether or not the sample insertion and removal button 71 is being selected after the sample image on the control screen 78 has been observed. If it is decided in the step S10 that the sample insertion and removal button 71 has indeed been selected, then the flow of control continues to the step S11. In this step S11, a command signal is outputted to the actuator 115 of the sample stage 11, and the sample stage 11 is shifted in the X direction so as to be projected to the outside through the insertion and removal aperture 10*b*. The operator removes the sample to be tested 10A when the sample stage 11 has reached and stopped in its state in which it is projected to the outside through the insertion and removal aperture 10*b*.

Moreover, if in the step S10 it is determined that the sample insertion and removal button 71 is not being selected, then the flow of control is returned to the step S8. When change of some value of setting of the microscope device 10 is commanded in this step S8, this value of setting of the microscope device 10 is altered in the step S9, and a magnified image 74 based upon the newly set value is displayed upon the display monitor.

After the sample to be tested 10A has been extracted, the flow of control continues to the step S12. In this step S12, a decision is made as to whether or not the sample insertion and removal button 71 has been selected again. If in this step S12 it is determined that indeed the sample insertion and removal button 71 is being selected, then the flow of control proceeds to the next step S13. In this step S13, a command signal is outputted to the actuator 115 of the sample stage 11, so as to shift said sample stage 11 in the X direction so as to retract it back into the interior of the microscope device 10.

After the sample stage 11 has been housed in the microscope device 10, the operator terminates the operation of the control program upon the host computer 50 by shutting it down. Thereafter, the power source of the microscope device 10 and of the host computer 50 is turned off.

Figure 6:
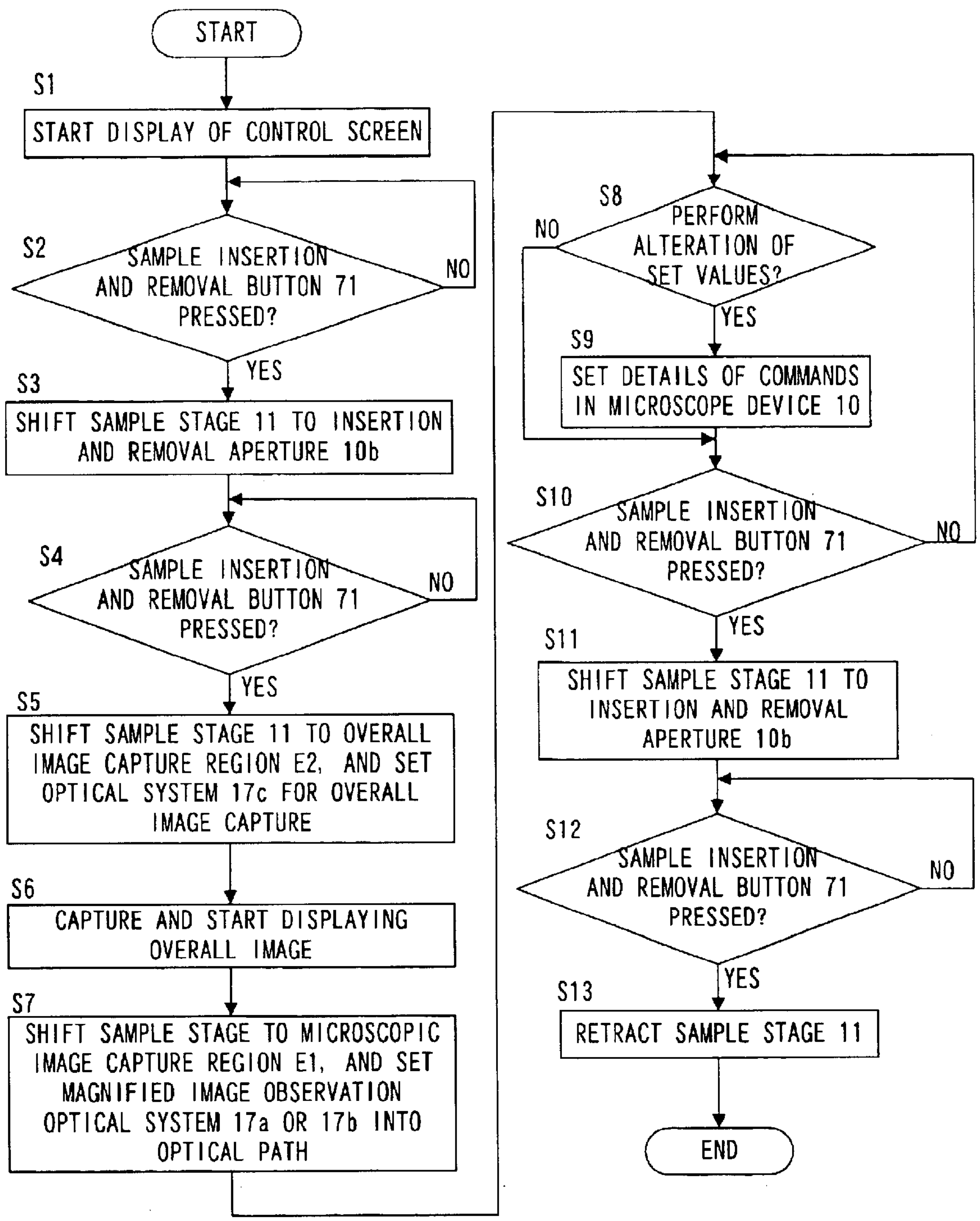
FIG. 6 is a flow chart showing the flow of a control program which is executed by a host computer.

Next, the generation of image data for the overall image of the sample to be tested 10A in the step S6 of the above described flow chart of FIG. 6 will be explained. In a related art type box shaped microscope device, it has taken a very long time for such an overall image of the sample to be tested to be displayed. In this connection, with the microscope device 10 according to the present invention, as disclosed in Japanese Laid-Open Patent Publication No. H10-333056, the sample stage 11 with the sample to be tested 10A mounted on it is shifted stepwise, and image data is captured by the imaging section 18 while it is at each of its positions. The host computer 50 generates image data for the overall image of the sample to be tested 10A by fitting together this image data thus captured by the imaging section 18. In the following, the details of generation of the image data for the overall image of the sample to be tested 10A will be explained with reference to FIG. 5.

As shown in FIG. 5, in this first preferred embodiment of the present invention, the field of view region e1 of the optical system 17*c* for capturing an overall image is sufficiently wide to cover almost half of the sample to be tested 10A. Due to this, it is possible to cover the entire sample to be tested 10A in two steps. It should be understood that in FIG. 5 the left side of the figure is the side upon which the insertion and removal aperture 10*b* is located.

First, as shown in FIG. 5, the sample stage 11 is shifted so that the field of view range e1 of the optical system 17*c* for capturing an overall image covers the half range of the sample to be tested 10A which is on the side opposite to the insertion and removal aperture 10*b*. The sample stage 11 is stopped in the position in which the field of view range e1 of the optical system 17*c* for capturing an overall image covers the half range of the sample to be tested 10A which is on the side opposite to the insertion and removal aperture 10*b*, and in this state the imaging section 18 is driven and image data is captured. Next, the sample stage 11 is shifted so that the field of view range e1 of the optical system 17*c* for capturing an overall image covers the remaining half range of the sample to be tested 10A which is on the side towards the insertion and removal aperture 10*b*. The sample stage 11 is stopped in the position in which the field of view range e1 of the optical system 17*c* for capturing an overall image covers this other remaining half range of the sample to be tested 10A, and in this state the imaging section 18 is again driven and further image data is captured.

The overall image of the sample to be tested 10A is synthesized by connecting together the two sets of image data which have been captured in these two positions. The synthesized overall image 72 is displayed upon the control screen 78 of the display device 60.

As has been explained above, in order to capture an overall image of the sample to be tested 10A, the optical system 17*c* for capturing an overall image of the entire sample is provided with a wide field of view range e1. Due to this, it is possible for this overall image to be captured relatively quickly.

Furthermore, the imaging section 18 for capturing the overall image of the sample to be tested 10A is one and the same with the imaging section 18 for capturing the magnified image. This can be attained by making it possible to change over between the optical system 17*c* for capturing an overall image of the entire sample, and the high magnification magnified image observation optical system 17*a* or the low magnification magnified image observation optical system 17*b*. Due to this structure, the number of the parts composing the microscope device 10 is made not to be increased.

Next, the process of changing the values of the settings of the microscope device 10 in the steps S8 and S9 of the flow chart of FIG. 6 described above will be explained.

The example has been discussed in which, in the steps S8 and S9, the desired observation point was designated by the operator by actuation of the cross cursor 73 upon the overall image 72. The set value for the microscope device 10 has been changed according to the position of the cross cursor 73. Herein, the method of changing set values in the microscope device 10 by actuating the control buttons 75, 76, and 77 will be explained.

It should be noted that the sliders 77 comprises a lamp adjustment bar 77*a* for adjustment of the voltage of the light source lamp 16*a*, a light reduction amount adjustment bar 77*b* for selection of the light reduction amount to be provided by the light reduction filter 16*b*, a field stop adjustment bar 77*d* for adjustment of the aperture diameter of the field stop 16*d*, and an aperture stop adjustment bar 77*e* for adjustment of the aperture diameter of the aperture stop 16*e*. Furthermore, it comprises an X position adjustment bar 77*x* for adjusting the position in the X direction of the sample stage 11, a Y position adjustment bar 77*y* for adjusting the position in the Y direction of the sample stage 11, a focal point adjustment bar 77*z* for performing focus adjustment, a zoom adjustment bar 77*f* for performing digital zoom, and the like. The operator is enabled to change the set values of the light reduction amount and so on according to his will, by adjustment of these sliders 77*a* through 77*f*.

First, focal point adjustment for the desired observation point is performed by using the sliders 77. The operator actuates the focal point adjustment bar 77*z* by using the input device 70, and thereby performs focal point adjustment by shifting the sample stage 11 in the Z direction in FIG. 3. After thus performing focal point adjustment, he actuates the X position adjustment bar 77*x* in order to bring the desired observation point within the field of view region of the objective lens, and thereby the sample stage 11 is shifted in the X direction. In an identical manner, he actuates the Y position adjustment bar 77*y* in order to shift the sample stage 11 in the y direction. If so required at this time, he may set the observational magnification to low magnification by actuating the radio button 75, then performs focal point adjustment for the desired observation point. After this, he sets the observational magnification to high magnification by actuating the radio button 75, and yet again performs focal point adjustment for the desired observation point by minutely actuating the focal point adjustment bar 77*z* yet again.

If he considers that the brightness of the magnified image 74 upon the control screen 78 is not appropriate, the operator may actuate the lamp adjustment bar 77*a* and the light reduction amount adjustment bar 77*b*. Or he may actuate only one of the lamp adjustment bar 77*a* and the light reduction amount adjustment bar 77*b*. By doing this, he performs adjustment of the brightness of the light source lamp 16*a*, and adjusts the brightness of the magnified image 74. It should be understood that the light adjustment of the magnified image 78 is performed automatically, for example the brightness of the light source lamp 16*a* is altered depending on the observational magnification. Furthermore, same as the automatic exposure in the photographic camera, the gain of the amplifier for the image signal generated by the imaging section 18 is automatically altered when the brightness of the magnified image 78 has been changed due to the opening amount of the aperture or the shade of the sample. It is possible for the operator to alter the brightness of the magnified image 78 by operating the adjustment bars 77*a* and 77*b* according to his will.

If the quality of the magnified image 74 is poor, it may be the case that the illumination light is illuminating areas other than the observation point, and that scattered light from these areas other than the observation point is deteriorating the quality of the magnified image 74. In such a case, the operator should actuate the field stop adjustment bar 77*d* and should reduce the aperture diameter of the field stop 16*d*, so as to perform adjustment in order to ensure that, to the maximum extent possible, the illumination light does not illuminate areas other than the observation point. Furthermore, if the operator desires to give priority to contrast even to the extent of somewhat sacrificing the resolution of the magnified image 74 in the X or Y direction, it is effective for him to actuate the aperture stop adjustment bar 77*e* and to reduce the aperture diameter of the aperture stop 16*e*. The operator sets the value of the aperture diameter of the aperture stop 16*e* to what he feels to be the most appropriate value while closely monitoring the resolution of the magnified image 74 in the X and the Y directions and also the contrast. As he varies the aperture diameter of the aperture stop 16*e*, the brightness of the magnified image 74 will also vary. Because of this, he may also adjust the brightness of the illumination light by actuating the lamp adjustment bar 77*a* and/or the light reduction amount adjustment bar 77*b*, as desired.

The operator is able to display the magnified image 74 at any desired size by adjusting the zoom adjustment bar 77*f*. When he does so, the central portion of the magnified image 74 is cut out and expanded so as to provide an electronically zoomed image.

According to the actuation of the control buttons 75, 76 and 77 as explained above, the host computer 50 controls the actuators 111, 115, 117, and 116*b* through 116*e* and so on as will be described below. At this time, the host computer 50 controls the driving of the actuators 111, 115, 117, and 116*b* through 116*e* while monitoring the detection signals from the position sensors 121, 125, 127, and 126*b* through 126*e*.

The actuator 116*c* is driven according to the actuation state of the radio button 76, so as to change over the filter type of the special filter 16*c*. And the drive voltage which is supplied to the light source lamp 16*a* is varied according to the actuation of the lamp adjustment bar 77*a*. Moreover, the light reduction amount provided by the light reduction filter 16*b* is varied by driving the actuator 116*b* according to the actuation of the light reduction amount adjustment bar 77*b*. And the aperture diameter of the field stop 16*d* is changed by driving the actuator 116*d* according to the actuation of the field stop adjustment bar 77*d*. Moreover, the aperture diameter of the aperture atop 16*e* is changed by driving the actuator 116*e* according to the actuation of the aperture stop adjustment bar 77*e*. The actuator 115 is driven according to the actuation of the X position adjustment bar 77*x* and of the Y position adjustment bar 77*y*, so as to alter the position of the sample stage in the X direction and in the Y direction, respectively. The observational magnification is changed by driving the actuators 111 and 117 according to the selection state of the radio button 75. The actuator 115 is driven according to the actuation of the focal point adjustment bar 77*z*, so as to change the position of the sample stage 11 in the Z direction. Furthermore, image processing is performed upon the image data for the magnified image 74 so as to perform electronically-magnification or shrinkage thereof, according to the actuation of the zoom adjustment bar 77*f*.

As explained above, in this first preferred embodiment of the present invention, an optical system whose field of view region is wide is employed, and an image of the entire specimen is captured in steps. By doing this, it is possible quickly to obtain an overall image.

By changing over between the optical system for capturing an overall image of the entire specimen, the high magnification magnified image observation optical system, and the low magnification magnified image observation optical system, it is arranged to be able to position any one of these optical systems, as desired, into the optical path between the sample to be tested 10A and the imaging section. By doing this, it is possible to use the same imaging section for capturing an image of the entire specimen, and for capturing a magnified image of the section to be imaged, and accordingly it is possible to suppress increase of the number of parts in the microscope device as a whole.

It should be noted that, in the above described first preferred embodiment of the present invention, the shift stroke of the sample stage 11 in the X direction is set to be sufficiently long for it to be possible to provide the overall image capture region E2 between the insertion and removal aperture 10*b* of the microscope device 10 and the microscopic image capture region E1. However, it would also be acceptable to provide a handling mechanism, i.e. a so called robot arm, instead of setting the shift stroke of the sample stage 11 in the X direction to be so long. Here, by handling mechanism is meant a mechanism which grasps the sample to be tested 10A, and which then shifts the sample to be tested 10A between the sample stage 11 which is in the position of the microscopic image capture region E1 and the insertion and removal aperture 10*b*. However, the method of setting the stroke of the sample stage 11 in the X direction to be sufficiently long can be more simply implemented, because in this case no special mechanism is required.

Furthermore, the sample insertion and removal button 71 is provided upon the control screen 78 on the display device 60, for performing projection and withdrawal of the sample stage 11. However, instead of this sample insertion and removal button 71, it would also be acceptable to provide a sample insertion and removal button 79 of the type shown in FIG. 2 on the outer surface of the case 10*a* of the microscope device 10. Furthermore, it would also be possible to provide both the sample insertion and removal button 71 upon the control screen 78, and also the sample insertion and removal button 79 upon the outer surface of the case 10*a*.

Moreover, it should be noted that, in this first preferred embodiment of the present invention, the entire actuation of the microscope device and observation of the specimen is performed upon the control screen. For this reason, no eyepiece lens is provided. This is because, along with recent rapid improvements, particularly increase of pixels, of image capture devices, the quality of electronic images has become just as good as that of eyepiece observations which are performed through an eyepiece lens. It would also be possible, however, to provide this microscope system with a combination of both a control screen and also an eyepiece lens. The third preferred embodiment of the present invention, to be described hereinafter, is an example of this concept.

Embodiment 2

Figure 8:
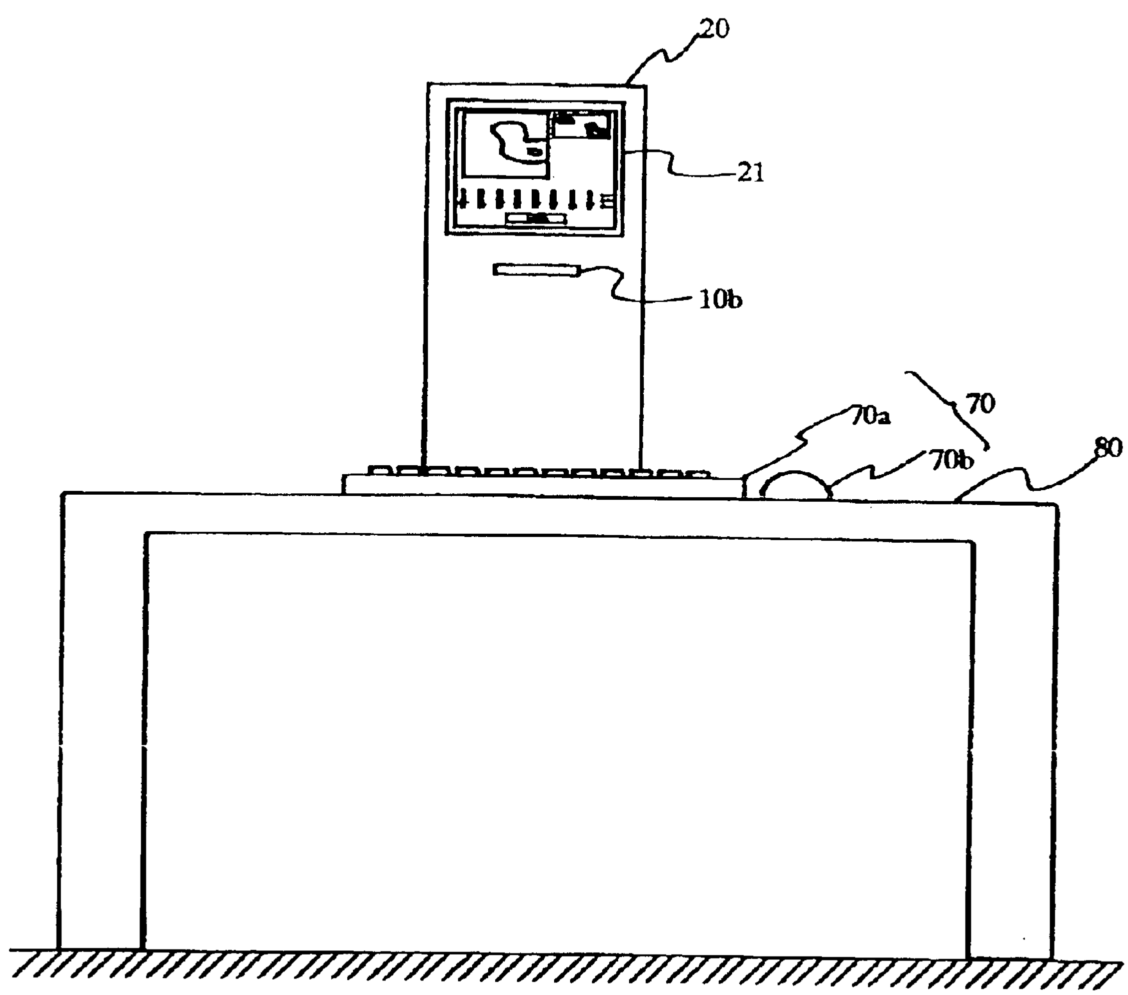
FIG. 8 is an overall structural view of a microscope system according to the second preferred embodiment of the present invention.
Figure 9:
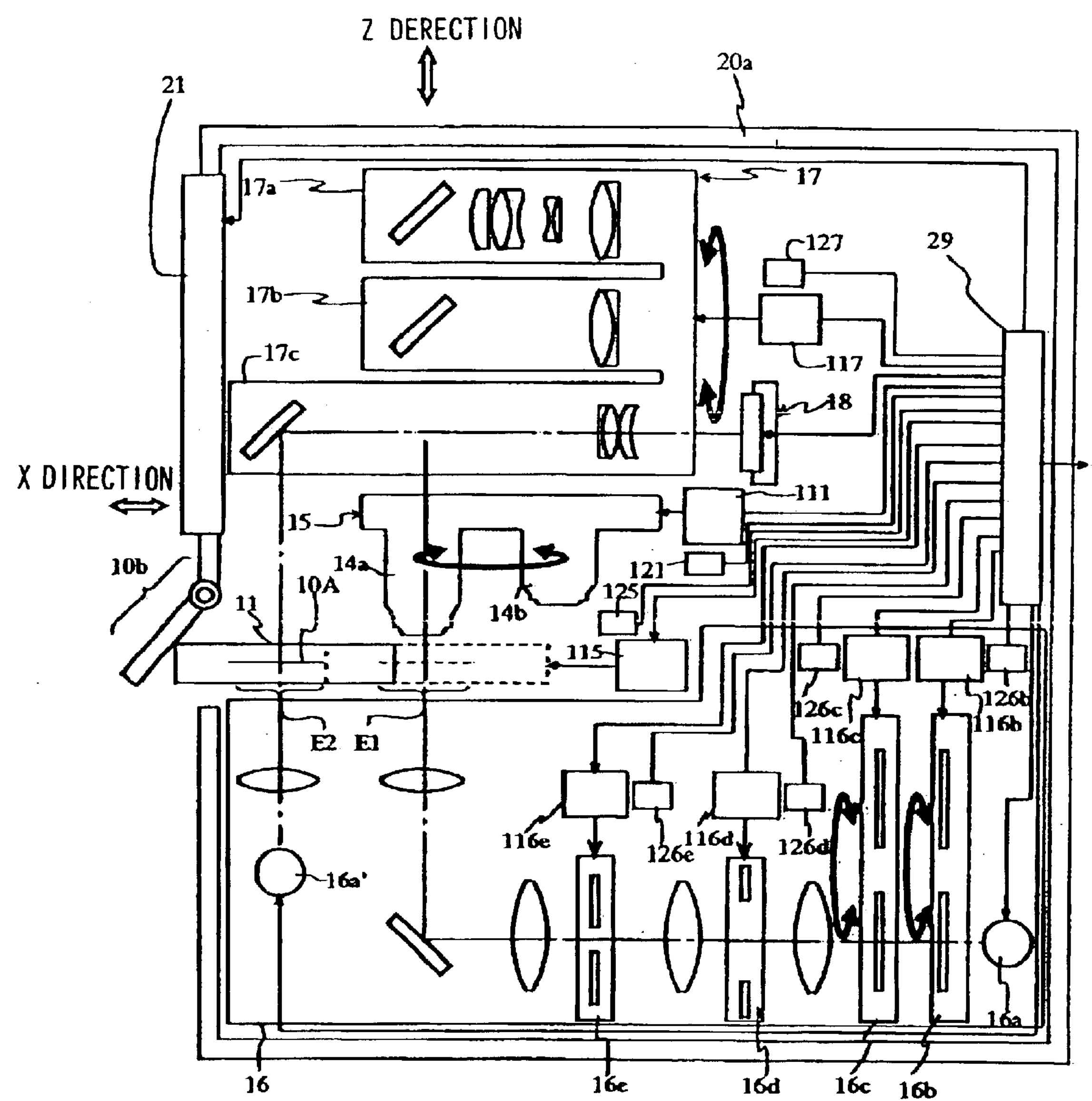
FIG. 9 is a structural view of this microscope device according to the second preferred embodiment.

Next, a second preferred embodiment of the present invention will be described with reference to FIGS. 8 and 9. FIG. 8 is an overall structural view showing a microscope system 2 comprising a microscope device 20, according to this second preferred embodiment of the present invention. And FIG. 9 is a structural view of this microscope device 20. It should be understood that, in FIGS. 8 and 9, structural elements of the second preferred embodiment which are the same as ones of the first preferred embodiment described above, and which have the same functions, are denoted by the same reference numerals.

As shown in FIG. 8, this microscope system 2 comprises the microscope device 20 and an input device 70, both provided upon a work bench 80. As shown in FIG. 9, a control section 29 which controls the operation of the microscope device 20 is housed within a case 20*a* of the microscope device 20. Furthermore, a display device is provided to the microscope device 20 for displaying an overall image and a magnified image of a sample to be tested 10A, various control buttons, and the like.

With this microscope device 20 according to the second preferred embodiment, just as with the microscope device 10 of the first preferred embodiment described above, the entire optical system and the entire mechanism are housed within the case 20*a*. The functions and the operations of the optical systems and the mechanisms are identical to those in the first preferred embodiment described above. Here, the explanation will focus upon the points of difference from the first preferred embodiment.

The control section 29 which is housed in the case 20 of the microscope device 20 comprises a circuit board not shown in the figures which is endowed with the same functions as the host computer 50 of the first preferred embodiment, and also comprises an electric power source also not shown in the figures.

The display device 21 is endowed with the same functions as the display device 60 of the first preferred embodiment. The display screen of the display device 21 is mounted upon the side surface of the case 20*a* of the microscope device 20, in a position in which an operator can easily see it. This display device 21 maybe a liquid crystal type display device, or the like. It is possible to keep the overall size of the microscope device 20 relatively small by constituting the display device 21 as a liquid crystal type display device, which can be made relatively thin. It should be noted that the display device 21 may be provided separately from the microscope device 20, not mounting upon the case 20*a*, as long as the display screen of the display device 20 can be seen easily by the operator.

The control section 29 is connected to the display device 21 and to the input device 70, and is also connected to the various actuators for the microscope device 20.

The operator inputs commands—for example, to project the sample stage—by using the input device 70, as he watches the display device 21 which is provided upon the side surface of the microscope device 20. Command signals are despatched from the operator to the control section 29 of the microscope device 20 by inputting commands.

In other words, according to this second preferred embodiment of the present invention, the optical systems, mechanisms, circuitry, and power source and so on which are required for microscopic observation are all combined into a single unit, so as to constitute the microscope device. By doing this, it becomes easy to move the microscope device about, and to position it.

Embodiment 3

Figure 10:
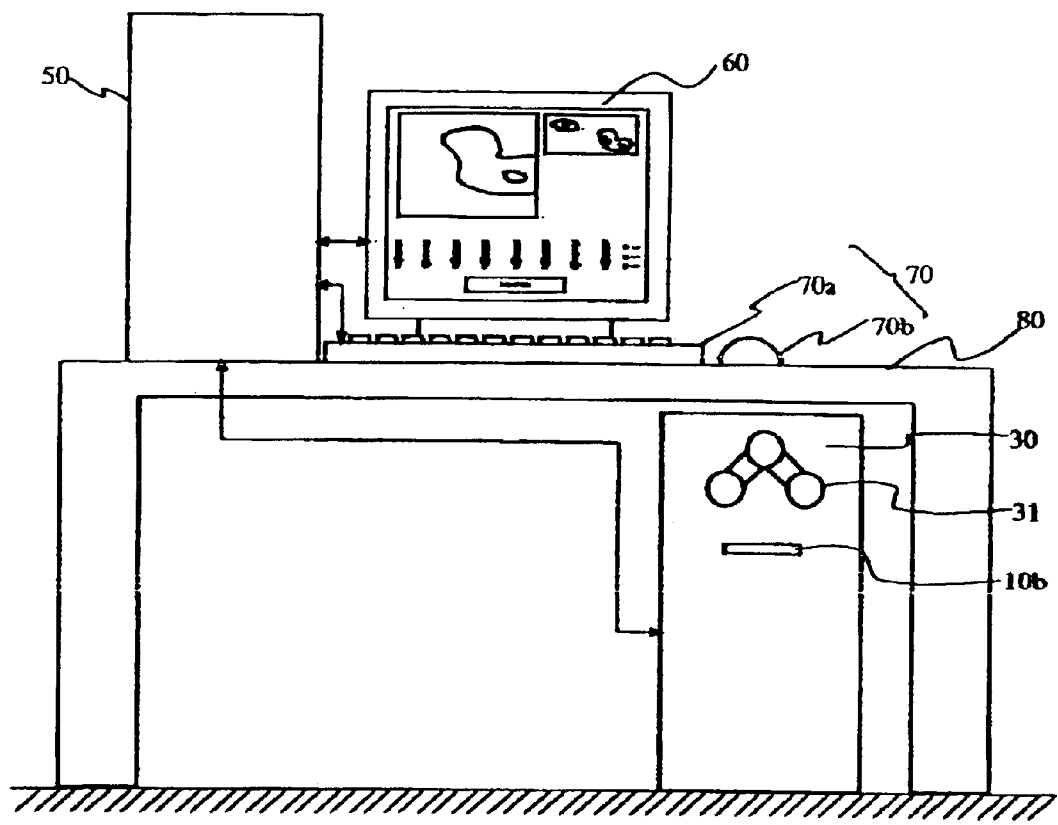
FIG. 10 is an overall structural view of a microscope system according to the third preferred embodiment of the present invention.
Figure 11:
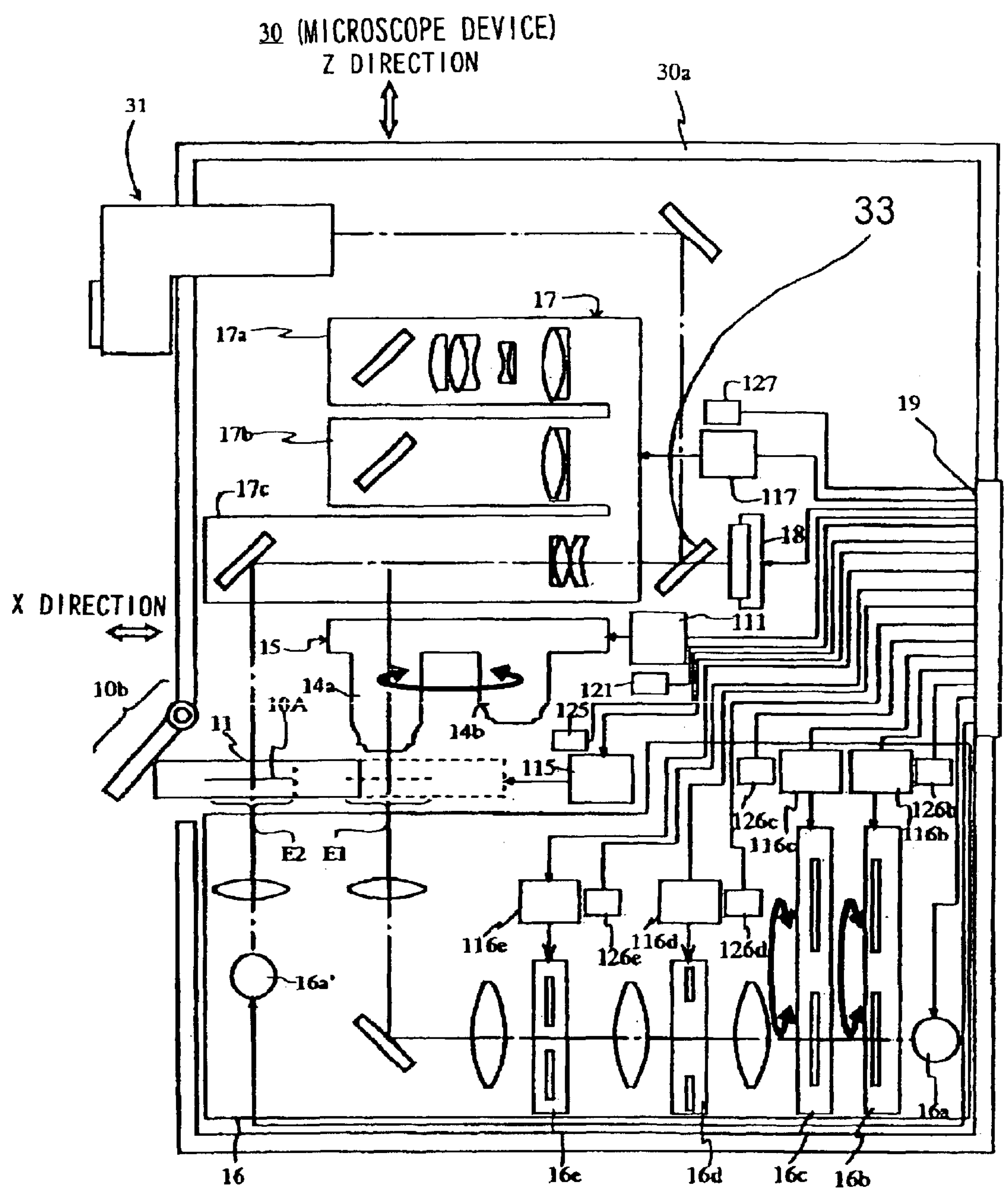
FIG. 11 is a structural view of this microscope device according to the third preferred embodiment.

Next, a third preferred embodiment of the present invention will be described with reference to FIGS. 10 and 11. FIG. 10 is an overall structural view showing a microscope system 3 comprising a microscope device 30, according to this third preferred embodiment of the present invention. And FIG. 11 is a structural view of this microscope device 30. It should be understood that, in FIGS. 10 and 11, structural elements of the third preferred embodiment which are the same as ones of the first preferred embodiment described above, and which have the same functions, are denoted by the same reference numerals.

As shown in FIG. 10, this microscope device 3 comprises a host computer 50 which is disposed upon a work bench 80, a display device 60 and an input device 70 which are likewise disposed upon the work bench 80, and the microscope device 30 which is disposed under the work bench 80 upon the floor.

With this microscope device 30 according to the third preferred embodiment, just as with the microscope device 10 of the first preferred embodiment described above, the entire optical system and the entire mechanism are housed within a case 30*a*. The functions and the operations of the optical systems and the mechanisms are identical to those in the first preferred embodiment described above. Here, the explanation will focus upon the points of difference from the first preferred embodiment.

As shown in FIGS. 10 and 11, this microscope device 30 further comprises an eyepiece unit (eyepiece observation system) 31, and an optical system which conducts light from a sample to be tested 10A to this eyepiece unit 31. The eyepiece unit 31, for example, may comprise two eyepiece lenses, one for the left eye and one for the right eye. Furthermore, it comprises a mechanism for adjusting the distance between the optical axes of each of these two eyepiece lenses. The two eyepiece lenses are fixed to the microscope device 30 so that they project outwards from the side surface of the case 30*a*.

Internally to the microscope device 30, a light flux which is incident from the sample to be tested 10A upon the imaging surface of the imaging section 18 is conducted to the eyepiece unit 31 via a half mirror 33 and the like. In other words, in this third preferred embodiment of the present invention, it is made possible for the operator to use the eyepiece unit 31 to observe the sample to be tested 10A by direct optical observation. Due to this, it is possible for the observer to observe the microscopic image at high resolution, since he is observing an optical image, rather than an electronic image which is being displayed upon the display device 60.

In the above described first and second preferred embodiments of the present invention, the actuation of the microscope device and the observation of the specimen were entirely performed upon the control screen. However, if the resolving power of the imaging section 18 is not sufficiently high, then it is effective to provide an eyepiece unit like the eyepiece unit 31 of this third preferred embodiment.

Furthermore, even if the resolving power of the imaging section 18 is sufficiently high, it will be acceptable to provide the eyepiece unit 31, if the more natural feeling of optical observation is considered to be sufficiently important.

Embodiment 4

Figure 12A:
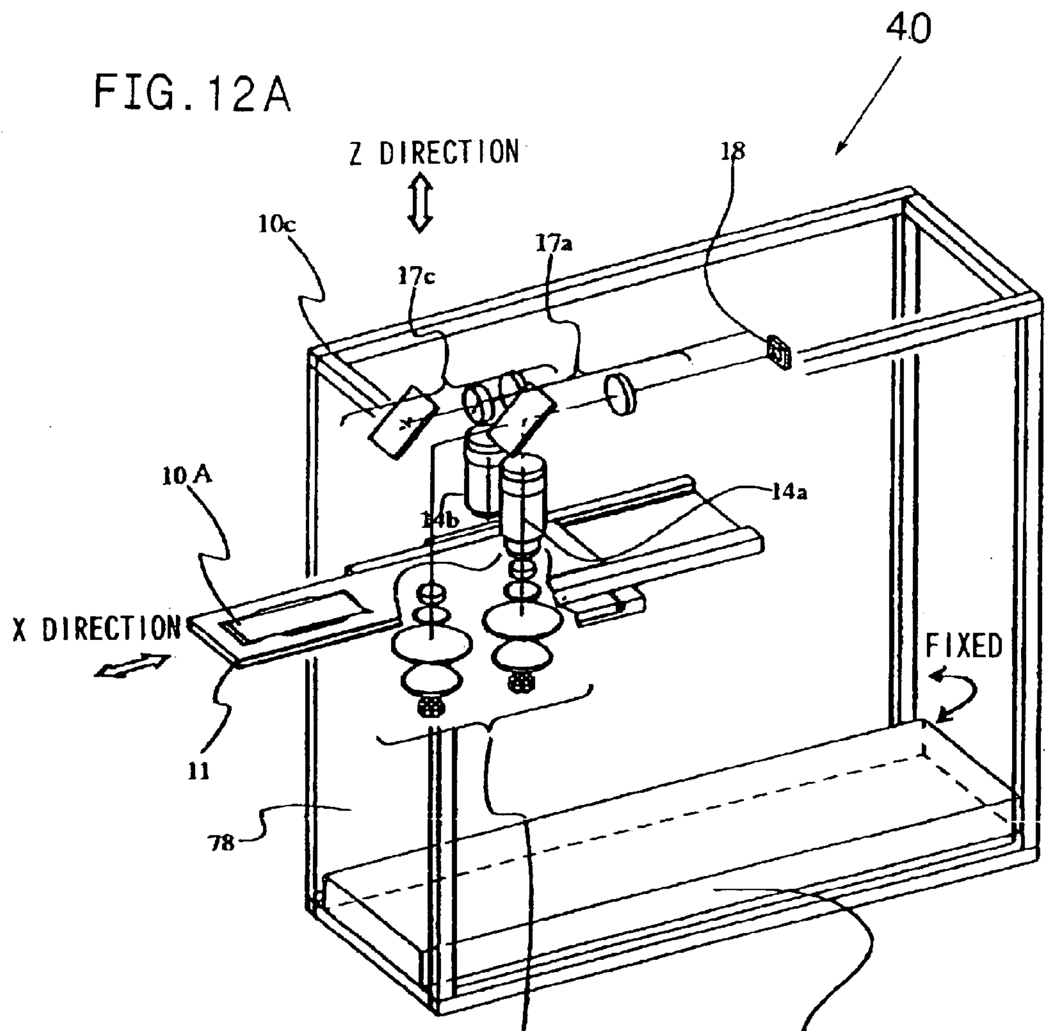
FIG. 12A is a view showing the positions of anti vibration members of this fourth preferred embodiment.
Figure 12B:
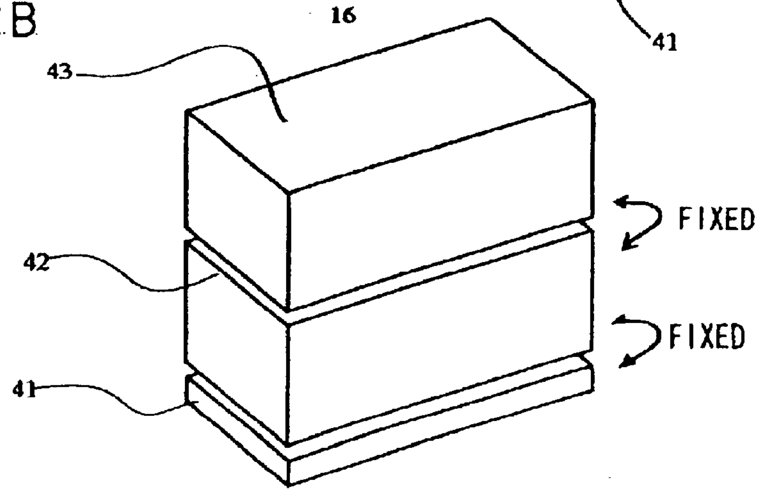
FIG. 12B is another view showing the positions of anti vibration members of this fourth preferred embodiment.

Next, a fourth preferred embodiment of the present invention will be described with reference to FIGS. 1, 12A and 12B. As well as being applicable to the first preferred embodiment, FIG. 1 also serves for showing the overall structure of this microscope system 4 according to the fourth preferred embodiment of the present invention, which comprises a microscope device 40, as well. And FIGS. 12A and 12B are views showing the overall structure of this microscope device 40 according to the fourth preferred embodiment. It should be understood that, in FIG. 12A, structural elements of the fourth preferred embodiment which are the same as ones of the first preferred embodiment described above, and which have the same functions, are denoted by the same reference numerals.

This microscope device 40 according to the fourth preferred embodiment is endowed with the same functions as the microscope device 10 which has been described above in connection with the first preferred embodiment. Furthermore, as shown in FIGS. 12A and 12B, an anti vibration member 41 is provided to the bottom of this microscope device 40.

When as shown in FIG. 1 the microscope device 40 is disposed upon the floor beneath the work bench 80, the state of the display of the microscopic image may be influenced by vibrations caused by people walking past or the like. Thus, the microscope device 40 of this fourth preferred embodiment of the present invention is provided with the anti vibration member 41, so as to absorb vibrations from the outside. The anti vibration member 41 may be made, for example, from a rubber material which has good elasticity, or from a ceramic material which absorbs vibration effectively.

The optical systems and mechanisms within the microscope device 40 are fixed to its frame 10*c* via this anti vibration member 41. The frame 10*c* is directly fixed to the cover 10*d* as shown in FIG. 4.

As shown in FIG. 12A, the anti vibration member 41 is provided to the bottom surface of the microscope device 40, and is fixed to the frame 10*c*. And, as shown in FIG. 12B, it is desirable for a power source circuit unit 42 which is combined into with various circuits and the power source and the like as a unitized construction to be fixed on top of the anti vibration member 41. Furthermore, it is desirable for an optical system unit 43 of a unitized construction which is combined into with the optical systems and mechanisms to be fixed on top of the power source circuit unit 42.

The order of arrangement of the anti vibration member 41, the power source circuit unit 42, and the optical system unit 43 can be changed. For example, it would be possible to arrange the power source circuit unit 42 on the bottom of the microscope device 40, to put the anti vibration member 41 on top of it, and then to fix the optical system unit 43 on top of that. In this case as well, the result would be that the optical system unit 43 was fixed to the frame 10*c* via the anti vibration member 41.

As described above, vibration which impinges upon the microscope device 40 from the outside is absorbed by the anti vibration member 41. Due to this, the vibration is not transmitted to the optical systems and mechanisms within the microscope device 40, and deterioration of the microscope image due to vibration is prevented. As a result, it becomes difficult for the microscope device 40 to suffer any influence from vibration caused by people passing or the like, even if said microscope device 40 is disposed upon the floor, and accordingly the freedom for choosing the position in which the microscope device 40 is to be located is enhanced.

Furthermore, since the bad influence upon the microscope image due to vibration is suppressed, therefore it becomes possible to build the microscope device 40 like a tower type computer. In other words, it becomes possible to increase the size of the microscope device 40 in the vertical direction. By doing this, the freedom for arrangement of the optical systems and mechanisms inside the microscope device 40 is increased.

It should be noted that it would also be acceptable to provide the anti vibration member 41 which has been explained with reference to the above described fourth preferred embodiment, to the microscope device 10 of the above described first preferred embodiment, or to the microscope device 20 of the above described second preferred embodiment, or to the microscope device 30 of the above described third preferred embodiment, as well.

In the above description of the fourth preferred embodiment of the present invention, the anti vibration member to be provided to the microscope device was described as being made from a material capable of absorbing vibration well. However it would also be possible, instead, to use a mechanical structure capable of absorbing vibration. In the above first through the fourth preferred embodiments of the present invention described above, the same imaging section 18 was used both for capturing the image of the entire specimen and also for capturing the magnified image of a portion thereof. However, it would also be acceptable to provide two separate imaging sections, and to capture the overall image with one of them and to capture the magnified image with the other. In such a case, it would become unnecessary to change over between the high magnification magnified image observation optical system 17*a* or the low magnification magnified image observation optical system 17*b*, and the optical system 17*c* for capturing the overall image of the entire specimen. Moreover, by providing two separate imaging sections, it would also be possible to perform capture of the overall image of the specimen very quickly.

In the following, the beneficial effects of the microscope device according to the preferred embodiments of the present invention described above will be explained. The microscope device according to the preferred embodiment is provided with a dedicated optical system for capturing an overall image of the entire specimen. Due to this provision, it becomes possible to capture this overall image very quickly.

This structure arranges for the imaging section which captures the magnified image which is an image of a partial region of the specimen, to be also used when capturing the image of the entire specimen By doing this, it becomes possible to keep the number of parts in the microscope device down, and to control its cost.

The structure provides for the magnified image and the overall image of the specimen to be captured in correspondence to an operation command by the imaging section. Due to this, it is possible to capture the overall image and the magnified image automatically.

The overall image and the magnified image of the specimen are displayed upon the display device, and the position of the magnified image with respect to the overall image is indicated by a mark superimposed upon the overall image. Due to this, it is possible for the operator easily to check the current point of observation upon the specimen.

The freedom with which the location of the microscope device may be chosen is increased by providing the anti vibration device to the microscope device. Furthermore, since the bad influence of vibration upon the microscope device is suppressed, it becomes possible to increase the size of the microscope device in the vertical direction by configuring it like a tower type computer. By doing this, the freedom of arrangement for the optical systems and the mechanisms within the microscope device is increased.

As a result, it becomes possible to implement a box shaped microscope device which provides good operability and a superb observational environment. This leads to a great leap ahead in analysis of the microscope image, and the productivity of microscope operations is also enhanced.

What is claimed is:

1. A microscope device, comprising:

a support member which supports a specimen;

a first optical system which generates an image of a partial region upon the specimen;

a second optical system which generates an overall image of the specimen;

a single imaging device which photoelectrically detects the images which are generated by said first optical system and by said second optical system respectively; and a changeover mechanism which changes over between a first optical path from the specimen via said first optical system to said imaging device, and a second optical path from the specimen via said second optical system to said imaging device, wherein;

the first optical path and the second optical path overlap with each other over a predetermined length from said imaging device, and said support member, said first optical system, said second optical system, said imaging device, and said changeover device are housed within a case.

2. A microscope device according to claim 1, further comprising:

a changeover control device which drives said changeover mechanism so as to present the first optical path and the second optical path to said imaging device in correspondence to an operation command.

3. A microscope device according to claim 2, further comprising:

a support member control device which shifts said support member so as that the specimen is opposed to either of said optical systems, when said changeover control device drives said changeover mechanism.

4. A microscope device according to claim 1, further comprising;

a display control device which displays together an image of a partial region upon the specimen and an overall image of the specimen which have been photoelectrically detected upon a display device, and superimposes, upon the overall image which is displayed, a predetermined mark in a position corresponding to the partial region.

5. A microscope device according to claim 4, wherein:

said support member is shifted in correspondence to shifting of the mark upon the overall image.

6. A microscope device according to claim 1, wherein:

a field of view region upon the specimen of said second optical system covers approximately half of the specimen.

7. A microscope device according to claim 1, further comprising:

an anti vibration structure which reduces vibration.

8. A microscope device according to claim 7, wherein:

said anti vibration mechanism is constituted by a member which absorbs vibration.

9. A microscope device according to claim 1, wherein:

said imaging device captures images of a plurality of different regions in the specimen through said second optical system so as to capture the overall image of the specimen.

10. A microscope device according to claim 9, further comprising:

an overall image generating device which fits together a plurality of image data captured by said imaging device so as to generate the overall image of the specimen.

11. A microscope device according to claim 1, wherein:

said imaging device captures images of a plurality of different regions in the specimen through said second optical system as the specimen is shifted by said support member so as to capture the overall image of the specimen.

12. A microscope device according to claim 11, further comprising:

an overall image generating device which fits together a plurality of image data captured by said imaging device so as to generate the overall image of the specimen.

13. A microscope system, comprising:

a microscope device which houses a support member which supports a specimen, a first optical system which generates an image of a partial region upon the specimen, a second optical system which generates an overall image of the specimen, a single imaging device which photoelectrically detects the images which are generated by said first optical system and by said second optical system respectively, and a changeover mechanism which changes over between a first optical path from the specimen via said first optical system to said imaging device and a second optical path from the specimen via said second optical system to said imaging device, within a case, the first optical path and the second optical path overlapping with each other over a predetermined length from said imaging device; and a control device which comprises a changeover control section which drives said changeover mechanism so as to present the first optical path and the second optical path to said imaging device in correspondence to an operation command, and a display control section which displays together upon a display device an image of a partial region upon the specimen and an overall image of the specimen which have been photoelectrically detected, and which superimposes, upon the overall image which is displayed, a predetermined mark in a position corresponding to the partial region.

14. A microscope system according to claim 13, further comprising:

an eyepiece unit for observing the specimen, wherein;

said eyepiece unit is constituted by an eyepiece lens and an optical system which conducts light from the specimen to said eyepiece lens.

15. A microscope system according to claim 13, wherein:

said imaging device captures images of a plurality of different regions in the specimen through said second optical system so as to capture the overall image of the specimen.

16. A microscope system according to claim 15, further comprising:

an overall image generating device which fits together a plurality of image data captured by said imaging device so as to generate the overall image of the specimen.

17. A microscope system according to claim 13, wherein:

said imaging device captures images of a plurality of different regions in the specimen through said second optical system as the specimen is shifted by said support member so as to capture the overall image of the specimen.

18. A microscope system according to claim 17, further comprising:

an overall image generating device which fits together a plurality of image data captured by said imaging device so as to generate the overall image of the specimen.

* * * * *